US011193624B2

(12) United States Patent
You

(10) Patent No.: US 11,193,624 B2
(45) Date of Patent: Dec. 7, 2021

(54) LIFTING DISPLAY SCREEN HANGER

(71) Applicant: Xiaodong You, Zhejiang (CN)

(72) Inventor: Xiaodong You, Zhejiang (CN)

(73) Assignee: Lumi Legend Corporation

(*) Notice: Subject to any disclaimer, the term of this patent is extended or adjusted under 35 U.S.C. 154(b) by 0 days.

(21) Appl. No.: 16/497,830

(22) PCT Filed: May 25, 2017

(86) PCT No.: PCT/CN2017/000369
§ 371 (c)(1),
(2) Date: Sep. 26, 2019

(87) PCT Pub. No.: WO2018/176180
PCT Pub. Date: Oct. 4, 2018

(65) Prior Publication Data
US 2020/0103069 A1 Apr. 2, 2020

(30) Foreign Application Priority Data
Mar. 29, 2017 (CN) .............................. 201710199207

(51) Int. Cl.
*F16M 11/04* (2006.01)
*F16M 11/18* (2006.01)
*F16M 11/16* (2006.01)

(52) U.S. Cl.
CPC ........... *F16M 11/046* (2013.01); *F16M 11/16* (2013.01); *F16M 11/18* (2013.01); *F16M 2200/047* (2013.01); *F16M 2200/061* (2013.01)

(58) Field of Classification Search
CPC .... F16M 11/043; F16M 11/046; F16M 11/16; F16M 11/18; F16M 2200/047; F16M 2200/048; F16M 2200/061; Y10S 248/917; Y10S 248/92; Y10S 248/921; Y10S 248/922; Y10S 248/923; Y10S 248/924
See application file for complete search history.

(56) References Cited

U.S. PATENT DOCUMENTS

| 2,932,403 A * | 4/1960 | Vershbow ................ B65G 1/07 211/59.3 |
| 4,828,119 A * | 5/1989 | Pingelton ................ B65G 1/07 211/59.3 |
| 5,181,620 A * | 1/1993 | Watt ...................... A47F 5/0081 108/136 |
| 5,722,331 A * | 3/1998 | Machael ................. A47B 9/02 108/145 |

(Continued)

*Primary Examiner* — Jonathan Liu
*Assistant Examiner* — Guang H Guan
(74) *Attorney, Agent, or Firm* — Design IP

(57) ABSTRACT

Disclosed is a lifting display screen hanger, comprising a movable rack assembly, a fixed rack assembly and a balance assembly. The balance assembly comprises a balance spring, a tension spring, a pulley component and a linkage component, the linkage component comprising a first linkage component and a second linkage component arranged to intersect each other at an intersection and hinged at the intersection thereof, and an uppermost hinged point of the first linkage component and the second linkage component being connected to the movable rack assembly. A draw cord is connected to a lower end of at least one of the first linkage component and the second linkage component by the pulley component.

8 Claims, 6 Drawing Sheets

(56) References Cited

U.S. PATENT DOCUMENTS

| | | | |
|---|---|---|---|
| 8,152,144 B2 | 4/2012 | Wisse et al. | |
| 8,192,331 B2 * | 6/2012 | Colombo | A61H 3/008 |
| | | | 248/575 |
| 8,194,403 B2 * | 6/2012 | Liu | F16M 11/046 |
| | | | 248/286.1 |
| 8,231,017 B2 * | 7/2012 | Clontz et al. | A47B 96/02 |
| | | | 211/134 |
| 9,091,393 B2 * | 7/2015 | Huang | F16M 11/046 |
| 9,222,616 B2 * | 12/2015 | Ergun | F16M 11/10 |
| 9,423,065 B2 * | 8/2016 | Stover | F16M 11/18 |
| 9,582,023 B2 * | 2/2017 | Aoyagi | G05G 1/025 |
| 9,624,967 B2 * | 4/2017 | Schlack | F16C 11/04 |
| 9,631,772 B1 * | 4/2017 | Huang | F16M 11/046 |
| 9,791,093 B2 * | 10/2017 | Aoyagi | F16M 11/046 |
| 9,863,579 B2 * | 1/2018 | Schinkel | F16M 11/08 |
| 10,190,725 B2 * | 1/2019 | Aoyagi | F16M 11/22 |
| 10,295,117 B2 * | 5/2019 | Huang | F16M 13/02 |
| 10,317,006 B2 * | 6/2019 | Kozlowski, Jr. | F16M 11/10 |
| 10,663,105 B2 * | 5/2020 | Chen | F16M 11/2014 |
| 2020/0103069 A1 * | 4/2020 | You | F16M 11/046 |

\* cited by examiner

LIFTING DISPLAY SCREEN HANGER

FIELD OF TECHNOLOGY

The invention relates to a display screen mounting device, particularly a lifting display screen hanger.

BACKGROUND OF THE INVENTION

Common large and oversized display screens, such as touch screens, interactive whiteboards, flat-screen TVs, computer monitors, have the characteristics of thin structure and vibrant images, having been widely used in homes and public places for entertainment, to display information and advertising media. These products are constantly updated as technology improves and quickly enters the residential, educational and commercial areas of daily life.

As an example, large touch screens used in public places are oversized and very heavy. Once these displays are mounted, the need to adjust might be required due to viewing placement or the height of the users, such as children in a classroom. Likewise, using a flat-screen TV as an example, displays used for entertainment might require after-mounting adjustments due to various sized viewers, changes in the viewing space or positioning the display in the most optimal manner based on the number of viewers watching the display. In addition, the eyesight of the user and the height of the center of TV dictate that the viewing "sweet spot" is rarely the same among a variety of viewers, therefore, a fixed, non-moving display can cause eye strain and discomfort to the user.

To solve the issues stated above, there are height adjustable hangar lifting mechanisms operated manually or by electric motor. The manual hanger such as a lifting flat-screen TV hanger disclosed in the Chinese patent CN202302624U (application number 201112035866.6) is comprised of two sliding pipes, a supporting plate and two sliding block bases. The front pipe walls of the two sliding pipes are provided with two keyhole slots to mount the TV and the back-pipe walls of the two sliding pipes are provided with adjustable slot holes. Two sliding block bases are respectively attached to two sliding pipes and the side plate of the sliding block base is provided with hang holes through which the expansion bolts pass. The hang holes are used in conjunction with the adjustable slot holes. The supporting plate is arranged on the front pipe wall in the lower part of the two sliding pipes by fastening pieces. The bottom plate of the supporting plate is in the bottom plane of two sliding pipes. Two adjustable bolts are fixed on the threaded holes on the base of the two sliding block bases in a rotary connection by holes through the bottom plate of the supporting plate. When two adjustable bolts on a threaded rod are rotated in the same direction, the adjustable bolts move the threaded rod upward and downward along the screw holes on the sliding block base, making the adjustable bolts have a lifting movement relative to the sliding block base in a vertical direction and leading the supporting plate, sliding pipes and the flat-screen TV to make a lifting movement together in a vertical direction.

Another manual hanger such as a lifting TV hanger disclosed in the Chinese patent application CN102997019A (application number 201210535851.7) comprises pulley set, draw cord, fixed base, rail and rack. The end of the draw cord passing through the pulley set and is fixed on the rack between two parallel rails and the other end of the draw cord is connected to the fixed base. The rack insert between two rails in a movable connection and the surface of the rack is provided with mounting holes. After every part is connected, the TV can be fixed on the rack. When pulling the draw cord downward, the draw cord leads the rack and the TV move upward along the rail by the pulley set and the draw cord can be fixed after the draw cord arrives at the specified position. The TV will move downward if the draw cord is loose and the rack move downward. Using the said hangers requires more force and extra position limit pieces to make the position of the TV fixed in the certain position after the TV is adjusted to the desired height. The operating space is small and extra tools are normally required bringing inconvenience to the use in addition to instability during lifting and adjusting the TV display.

The electric hanger such as a wall-mounted TV lifting adjustable TV hanger is disclosed in the Chinese patent CN205592605U (application number 201620248975.0). The I-shaped lifting hanger is provided with a sliding slot and the upper and lower ends of the I-shaped lifting hanger are provided with a buffer plate. Both ends of the buffer plate are provided with buffer bars and a proximity switch. The buffer bar is inserted into the I-shaped lift hanger and the spin axis of the micro-drive motor is fixed with the screw bar. The screw bar has the sliding block attached to it. The supporting bar is fixed on the sliding block and the ends of the supporting bar are fixed with the fixed plate of the TV. The micro-drive air cylinder is connected to the micro-drive motor, proximity switch and signal converter by wire. The output end of the micro-drive air cylinder is provided with a telescopic pneumatic rod. The movable linkage and the telescopic pneumatic rod are hinged by the hinged base.

Another electric hanger such as a lifting adjustable TV hanger disclosed in the Chinese patent application CN105697959A (application number 201610135861. X) comprises a first fixed plate. The front face of the first fixed plate is provided with a first through hole. The side plane of the first fixed plate and the sliding device are in a movable connection by sliding slot. The end of the sliding device away from the first fixed plate is connected to the second fixed plate. The front face of the second fixed plate is provided with a second through hole. The bottom of the second fixed plate is fixed with the reversible motor. The spin axis of the reversible motor is connected to the top of the screw column. The surface of the screw column is connected to a screw cap, and the side face of the screw cap is connected to the third fixed plate. Using the said hangers whose lifting is achieved by motors eliminates having to use more force as used in the manual hanger, but the drive device makes the overall structure more complex and extra energy is needed. And the drive device is always equipped with the remote control, which increases the chance of the control of the mount being lost by remote control being misplaced or confusion to new operators having to learn the remote functions.

SUMMARY OF THE INVENTION

The technical problems to be solved by the present invention are for the problems presented in the said prior art. The invention provides a lifting display screen hanger that can increase operational convenience and stability, simplify the structure and improve user experience.

The present invention is directed to a lifting display screen hanger comprising a movable rack assembly used to connect with display screen, a fixed rack assembly and a balance assembly, wherein the movable rack assembly comprises a first frame. The fixed rack assembly comprises a second frame. The first frame and the second frame are slidably connected; the balance assembly comprises a balance spring, a tension spring, a pulley assembly, and a linkage assembly. The upper end of the tension spring is connected to the top of the second frame. The lower end of the tension spring is connected to the bottom of the first frame. The upper end of the balance spring is connected to the top of the second frame. The lower end of the balance spring is connected to a draw cord. The linkage assembly comprises a first linkage component and a second linkage component. The lower end of the first linkage component is positioned at the bottom of the second frame. The lower end of the second linkage component is positioned at the bottom of the second frame. The first linkage component and the second linkage component intersect each other and are hinged at the intersection. The uppermost hinged point of the first linkage component and the second linkage component is connected to the movable rack assembly; routing through the pulley assembly, the draw cord is connected to either or both of the lower ends of the first linkage component or the second linkage component, such that the lower ends of the first linkage component and the second linkage component are kept close to each other. Thus, the resulting force of the tension spring and the balance spring acting on the movable rack assembly keeps balanced.

According to one aspect of the invention, the balance spring is comprised of a first balance spring and a second balance spring. The pulley assembly is comprised of a first pulley component and a second pulley component. The draw cord is comprised of a first draw cord and a second draw cord; the first pulley component is located at the bottom of the second frame, comprised of a first fixed pulley and a second fixed pulley. One end of the first draw cord is connected to the lower end of the first balance spring, the other end of the first draw cord bypasses downward below the first fixed pulley, extending to the second fixed pulley and after bypassing above the second fixed pulley, the other end of the first draw cord returns and is connected to the lower end of the first linkage component; the second pulley component is located at the bottom of the second frame, comprised of a third fixed pulley and a fourth fixed pulley. One end of the second draw cord is connected to the lower end of the second balance spring, the other end of the second draw cord bypasses downward below the third fixed pulley, extending to the fourth fixed pulley and after bypassing above the fourth fixed pulley, the other end of the second draw cord returns and is connected to the lower end of the second linkage component.

According to the preferred linkage assembly of the invention, the first linkage component is comprised of a first linkage and a second linkage. The lower end of the first linkage is connected to the first draw cord. The upper end of the first linkage and the lower end of the second linkage are hinged; the second linkage component is comprised of a third linkage and a fourth linkage. The lower end of the third linkage is connected to the second draw cord. The upper end of the third linkage and the lower end of the fourth linkage are hinged. The first linkage and the second linkage intersect each other and are hinged at the intersection. The second linkage and the fourth linkage intersect each other and are hinged at the intersection by a pin axis.

For smooth movement of the lower end of the linkage component on the second frame, the lower end of the first linkage is connected to a first track wheel and the lower end of the second linkage is connected to a second track wheel.

According to another aspect of the invention, there is only one balance spring and one draw cord. The lower end of the first linkage component is connected to the draw cord by the pulley assembly. The lower end of the second linkage component is fixed in the second frame.

For ease of adjusting pre-tension of the tension spring for display screens of different weights, the upper end of the tension spring is connected to the top of the second frame of the fixed rack assembly by a screw arbor.

The preferred connection between the linkage assembly and the movable rack assembly is that the movable rack assembly is further comprised of a rail and the rail is vertically located on the first frame. The uppermost hinged point of the first linkage component and the second linkage component is connected to the rail.

According to the invention, preferably, to decrease sliding friction of the movable rack assembly relative to the fixed rack assembly, limit the moving path and direction and to avoid forward and backward tilt, the movable rack assembly is further comprised a track that extends vertically upward. The track is located on the left side and the right side of the first frame. Every track has channels positioned facing the other track; the fixed rack assembly further comprises a first wheel that is located on the front side of the second frame and corresponds to the position of the track. The first wheel is located in the track in a sliding way.

To avoid left and right tilt of the movable rack assembly when lifting, the lower part of the front side of the second frame contains a connecting plate. The first frame is located between the second frame and the connecting plate. The back side of connecting plate is provided with a limiting bracket. There are two limiting brackets respectively on the left side and the right side of the rail. The left and the right side of the rail is provided with grooves which respectively dent toward the middle. Every groove extends in the vertical direction. Each limiting bracket corresponding to the said groove is provided with a second wheel and a third wheel with a rolling connection to the groove. The second wheel and the third wheel found on each of the limiting brackets are respectively arranged one above the other.

To cover the balance assembly, a covering plate is located and attached above the connecting plate and on the front side of the second frame. A slot is found in the center of the covering plate that corresponds to the rail. The pin axis passes through this covering plate slot and is connected to the rail.

Compared with the prior art, the invention has the advantage of stepless adjustment of height that can be easily achieved by setting and using linkage assembly to balance the elastic force between the balance spring and the tension spring. And no extra limit components and operational components are needed. The adjustment is convenient and the device works in a stable manner. Adjustments are made by the user without much force or having to exert much effort resulting in a pleasant user experience.

DETAILED DESCRIPTION OF THE INVENTION

Figure 1:
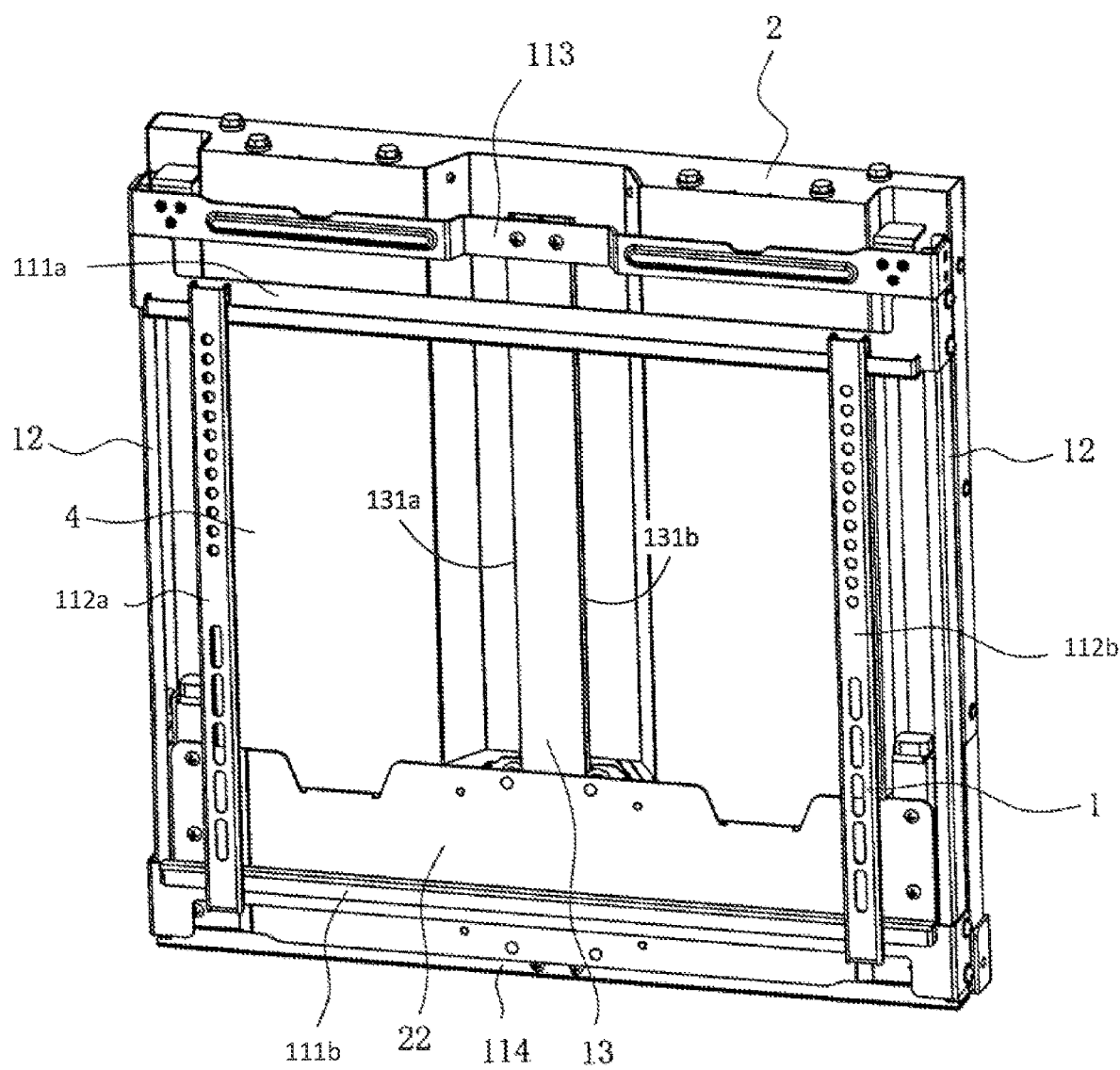
FIG. 1 is the front view of the first state of the embodiment of the present invention.

The present invention is further described in detail with reference to the following embodiments with drawings.

FIG. 1-FIG. 4 shown an embodiment of the lifting display screen hanger of the present invention. The lifting display screen hanger comprises a movable rack assembly 1, a fixed rack assembly 2 and a balance assembly 3, wherein the fixed rack assembly 2 is configured to be fixed on a wall and always remains stationary while the movable rack assembly 1 is attached to the fixed rack assembly 2 and makes a lifting movement relative to the fixed rack assembly 2. The balance assembly 3 is fixed between the fixed rack assembly 2 and the movable rack assembly 1 to provide lifting force. In the following description, "up," "down," "left," and "right" are the positions of the hanger relative to the user and are used to facilitate description and do not constitute any structural limitations.

The movable rack assembly 1 comprises a first frame 11 and a track 12, wherein the first frame 11 comprises a horizontal beam (see horizontal beams 111a, 111b), a vertical beam (see vertical beams 112a, 112b), a top plate 113 and a bottom plate 114. In this embodiment, there are two horizontal beams 111a, 111b and two vertical beams 112a, 112b respectively, wherein the upper horizontal beam 111a is arranged above the lower horizontal beam 111b, and the vertical beams 112a, 112b are arranged with a left vertical beam 112a and a right vertical beam 112b. The horizontal beams 111a, 111b, the top plate 113 and the bottom plate 114 extend in the horizontal direction, while the vertical beams 112a, 112b extend in the vertical direction. The top plate 113 is attached above the upper horizontal beam 111a, and the bottom plate 114 is attached below the lower horizontal beam 111b. The vertical beams 112a, 112b hang on the horizontal beams 111a, 111b. The flat-screen TV, touch screen and other display screens (not shown) are mounted on the front side of the vertical beams 112a, 112b and connected to the vertical beams 112a, 112b, such that the display screens have a synchronal lifting with the first frame 11 of the movable rack assembly 1. The space between the two vertical beams 112a, 112b can be adjusted as desired. The bottom plate 114 is on the back side of the lower horizontal beam 111b, and the bottom plate 114 is at least partially on the back side of the top plate 113, such that the top plate 113 does not completely obscure the top of the bottom plate 114 to facilitate the attachment of the balance assembly 3.

There are two tracks 12 located on the left and right side of the first frame 11. Every track 12 extends in a vertical direction and is parallel to the vertical beams 112a, 112b. The upper end of every track 12 is fixed with the end of the top plate 113 and the upper horizontal beam 111a respectively. The lower end of every track 12 is fixed with the end of the bottom plate 114 and the lower horizontal beam 111b respectively. Every track 12 has channels positioned facing the other track, making the cross-section of the track approximately U-shaped. The channel faces downward, making the vertical cross-section approximately U-shaped.

The movable rack assembly 1 comprises a rail 13 attached to the first frame 11. The rail 13 is used to connect with the balance assembly 3. The connection is described in detail below. The rail 13 is between the two vertical beams 112a, 112b, preferably in the middle. Similarly, the rail 13 extends in the vertical direction and is parallel to the vertical beams 112a, 112b. The upper end of the rail 13 is fixed with the top plate 113, and the lower end of the rail 13 is fixed with the bottom plate 114. In this embodiment, the top plate 113 is on the front side of the rail 13, and the top plate 113 bends backward in the position corresponding to the upper end of the rail 13, such that the top plate 113 is fixed with the upper end of the rail 13. The rail 13 is above the bottom plate 114, and the lower end of the rail 13 is fixed at the channel of the bottom plate 114.

The fixed rack assembly 2 comprises the second frame 21, the connecting plate 22, the first wheel 23 and the plate 27 covering on the back side of the bottom of the second frame 21. The connecting plate 22 is attached at the below part of the front side of the second frame 21, and there are certain intervals between the connecting plate 22 and the second frame 21. The movable rack assembly 1 is attached on the front side of the second frame 21, and the movable rack assembly 1 is inserted from the bottom up between the second frame 21 and the connecting plate 22 to facilitate the lifting movement of the movable rack assembly 1. The top of the second frame 21 extends forward and at least partially overlaps with the bottom plate 114 to facilitate the attachment of the balance assembly 3.

The first wheel 23 is comprised of two groups that are located on the front side of the second frame 21 and respectively correspond to the position of the track 12. The rotation axis of the first wheel 23 extends horizontally in the left and right directions and the first wheel 23 is attached inside the track 12. As the movable rack assembly 1 slides relative to the fixed rack assembly 2, the movement of the track 12 and the first wheel 23 provide stability with the movable rack assembly 1 to avoid the forward and backward tilt of the movable rack assembly 1 and reduce sliding friction.

The back side of the connecting plate 22 is provided with left and right limiting brackets 24a, 24b that are respectively on the left side and the right side of the rail 13. The left and the right side of the rail 13 are provided with left and right grooves 131a, 131b which respectively dent toward the middle. The left and right grooves 131a, 131b extend in the vertical direction. The left limiting bracket 24a is located on the left side of the rail 13 and is installed with the second wheel 25, and the side of the second wheel 25 is positioned along the left groove 131a of the rail 13 to create a rolling connection. The right limiting bracket 24b is located on the right side of the rail 13 and is installed with the third wheel 26, and the side of the third wheel 26 is positioned along the right groove 131b of the rail 13 to also create a rolling connection. Preferably, the second wheel 25 and the third wheel 26 are symmetrically arranged with one wheel positioned at the upper end of its limiting bracket and one wheel positioned at the lower end of its limiting bracket. The rotation axes of the second wheel 25 and the third wheel 26 extend forward and backward, such that tilting is inhibited when the movable rack assembly 1 is lifted relative to the fixed rack assembly 2, and the movable rack assembly 1 maintains movement in a vertical direction. Additional wheels can be added to the second wheel 25 and the third wheel 26 as desired. The upper part of the connecting plate 22 and the front side of the second frame 21 are covered with a covering plate 4, such that a portion of the balance assembly 3 inside the fixed rack assembly 2 can be covered to make the hanger look beautiful and avoid interference with the balance assembly 3. A covering plate slot 41 is found in the center of the covering plate 4 that corresponds to the rail 13. The pin axis 33 passes through this covering plate slot 41 and is connected to the rail 13.

The balance assembly 3 is comprised of a tension spring, a balance spring, a pulley assembly, and a linkage assembly. The upper end of the tension spring is connected to the top of the fixed rack assembly 2 of the second frame 21 by a screw and the lower end of the tension spring is fixed on the bottom plate 114 of the movable rack assembly 1. The upper end of the balance spring is fixed with the top of the second frame 21 of the fixed rack assembly 2 and the lower end of the balance spring is connected to the bottom of the linkage assembly after changing the direction through the pulley assembly.

In this embodiment, the balance assembly 3 comprises a first balance component 31 and a second balance component 32. The first balance component 31 has the same structure as the second balance component 32 and both are symmetrically positioned on opposing lateral sides of the balance assembly 3. In this embodiment, the first balance component 31 is composed of a first tension spring 311, a first balance spring 312, a first pulley component (refers to a first fixed pulley 313 and a second fixed pulley 314) and a first linkage component 316 in the vertical plane. The vertical plane is the vertical space formed between the top and the bottom of the first frame 11 and the second frame 21 or the space parallel to the vertical space.

The lower end of the first tension spring 311 is fixed on the bottom plate of the movable rack assembly 1 and the upper end of the first tension spring 311 is connected to the top of the second frame 21 of the fixed rack assembly 2 by the first screw 317. Turning the first screw 317 can adjust the pre-tension of the first tension spring 311. As the upper end of the first tension spring 311 is adjusted higher, the greater the force of the first tension spring 311 becomes, thereby increasing the weight capacity of the first balance component 31. In this embodiment, there are two first tension springs 311 and the number of tension springs can be changed as desired. The upper end of the first balance spring 312 is fixed on the top of the second frame 21 of the fixed rack assembly 2. The first fixed pulley 313 and the second fixed pulley 314 are located at the bottom of the second frame 21, wherein the position of the first fixed pulley 313 corresponds to the position of the first balance spring 312 and the second fixed pulley 314 is in the middle of the bottom of the second frame 21. The first balance component 31 is comprised of a first draw cord 319. One end of the first draw cord 319 is connected to the lower end of the first balance spring 312. The other end of the first draw cord 319 bypasses downward below the first fixed pulley 313 and extends toward the middle part of the second fixed pulley 314, after bypassing above the second fixed pulley 314, as the draw cord has changed the direction, the other end of the first draw cord 319 is connected to the lower end of the first linkage component 316. To make the bottom of the first linkage component 316 have smooth movements on the second frame 21, a first track wheel 315 is positioned at the bottom of the first linkage component 316. A first sliding track 318 is attached at the bottom of the second frame 21 and between the first fixed pulley 313 and the second fixed pulley 314. The first sliding track 318 extends horizontally in the left and right direction and the first track wheel 315 can roll along the first sliding track 318. The first track wheel 315 is provided with a first connecting piece 3151 moving with the first track wheel 315. The first draw cord 319 extends toward the first track wheel 315 after bypassing the second fixed pulley 314 and is connected to the first connecting piece 3151 of the first track wheel 315 which is located at the lower end of the first linkage component 316. The lower end of the first linkage component 316 is hinged with the rotation axis of the first track wheel 315. In order to avoid contact or interference of the first draw cord 319 and the first track wheel 315 between the first fixed pulley 313 and the second fixed pulley 314, the first track wheel 315 is positioned lower than the second fixed pulley 314.

The second balance component 32 comprises a second tension spring 321, a second balance spring 322, a second pulley component (refers to a third fixed pulley 323 and a fourth fixed pulley 324) and a second linkage component 326 in the vertical plane, wherein the lower end of the second tension spring 321 is fixed on the bottom plate 114 of the movable rack assembly 1 and the upper end of the second tension spring 321 is connected to the top of the second frame 21 of the fixed rack assembly 2 by the second screw 327. Turning the second screw 327 can adjust the pre-tension of the second tension spring 321. As the upper end of the second tension spring 321 is adjusted higher, the greater the force of the second tension spring 321 becomes, thereby increasing the weight capacity of the second balance component 32. In this embodiment, there are two second tension springs 321 and the number can be changed as desired. The upper end of the second balance spring 322 is fixed on the top of the second frame 21 of the fixed rack assembly 2. The third fixed pulley 323 and the fourth pulley 324 are located at the bottom of the second frame 21, wherein the position of the third fixed pulley 323 corresponds to the position of the second balance spring 322 and the fourth fixed pulley 324 is in the middle of the bottom of the second frame 21.

The second balance component 32 is composed of a second draw cord 329. One end of the second draw cord 329 is connected to the lower end of the second balance spring 322. The other end of the second draw cord 329 bypasses downward below the third fixed pulley 323 and extends toward the middle part of the fourth fixed pulley 324. After bypassing above the fourth fixed pulley 324, as the draw cord has changed the direction, the other end of the second draw cord 329 is connected to the lower end of the second linkage component 326. To make the bottom of the second linkage component 326 have smooth movements on the second frame 21, a second track wheel 325 is positioned at the bottom of the second linkage component 326. A second sliding track 328 is located at the bottom of the second frame 21 and between the third fixed pulley 323 and the fourth fixed pulley 324. The second sliding track 328 extends horizontally in the left and right direction and the second track wheel 325 can roll along the second sliding track 328. The second track wheel 325 is provided with a second connecting piece 3251 moving with the second track wheel 325. The second draw cord 329 extends toward the second track wheel 325 after bypassing the fourth fixed pulley 324 and is connected to the second connecting piece 3251 of the second track wheel 325 which is located at the lower end of the second linkage component 326. The lower end of the second linkage component 326 is hinged with the rotation axis of the second track wheel 325. In order to avoid contact or interference of the second draw cord 329 and the second track wheel 325 between the third fixed pulley 323 and the fourth fixed pulley 324, the second track wheel 325 is positioned lower than the fourth fixed pulley 324.

In this embodiment, the first linkage component 316 comprises a first linkage segment 3161 and a second linkage segment 3162 and the second linkage component 326 comprises a third linkage segment 3261 and a fourth linkage segment 3262. The lower end of the first linkage segment 3161 is connected to the first track wheel 315 and the upper end of the first linkage segment 3161 is hinged with the lower end of the second linkage segment 3162. The lower end of the third linkage segment 3261 is connected to the second track wheel 325 and the upper end of the third linkage segment 3261 is hinged with the lower end of the fourth linkage segment 3262. The first linkage segment 3161 and the third linkage segment 3261 intersect each other and are hinged at the intersection. The second linkage segment 3162 and the fourth linkage segment 3262 intersect each other and are hinged at the intersection by the pin axis 33. The pin axis 33 is connected to the back side of the rail 13 by a connecting block 34. Alternatively, the first linkage component 316 can only comprise the second linkage segment 3162 and the second linkage component 326 can only comprise the fourth linkage segment 3262. The pin axis 33 is attached at the intersection of the second linkage segment 3162 and the fourth linkage segment 3262. Alternatively, the first linkage component 316 can further comprise a fifth linkage segment or more linkage segments and the second linkage component 326 can further comprise a sixth linkage segment or more linkage segments. Every linkage segment of every linkage component should be hinged and every linkage component should have the same number of the segments. The total number of the linkage segments of the linkage component is an even number, the linkage segments of the two linkage components intersect each other and are hinged while the uppermost hinged point is provided with the pin axis 33 connected to the rail 13. In this application, "intersect" is where the uppermost ends of two intersected linkage segments over the intersection point extend upward (such as the intersection structure between the first linkage segment 3161 and the third linkage segment 3261) and the situation where the uppermost ends of two intersected linkage segments overlap (such as the intersection structure between the second linkage segment 3162 and the fourth linkage segment 3262). The two preferred linkage segments at the uppermost intersection of every linkage component overlap on the uppermost end. The uppermost end is provided with the pin axis 33, such that the linkage component can be connected to the movable rack assembly 1 to make the intersection position move with the movable rack assembly 1.

As a result, when the movable rack assembly 1 is lifting, the uppermost ends of the first linkage component 316 and the second linkage component 326 are lifting with the movable rack assembly 1. At the same time, the lower end of the first linkage component 316 and the second linkage component 326 horizontally slide face to face or in an opposite direction.

Figure 2:
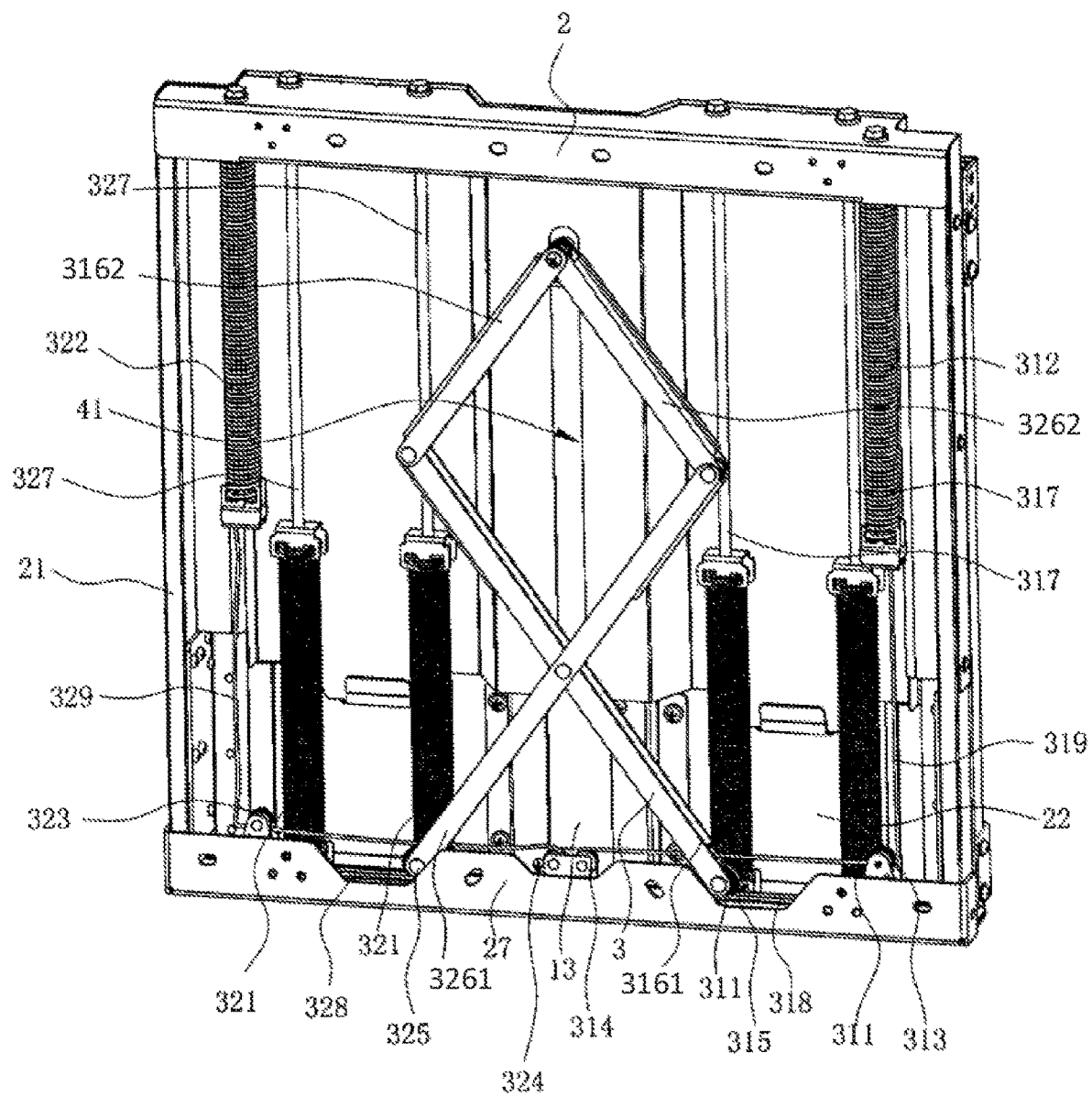
FIG. 2 is the rear view of the first state of the embodiment of the present invention.
Figure 3:
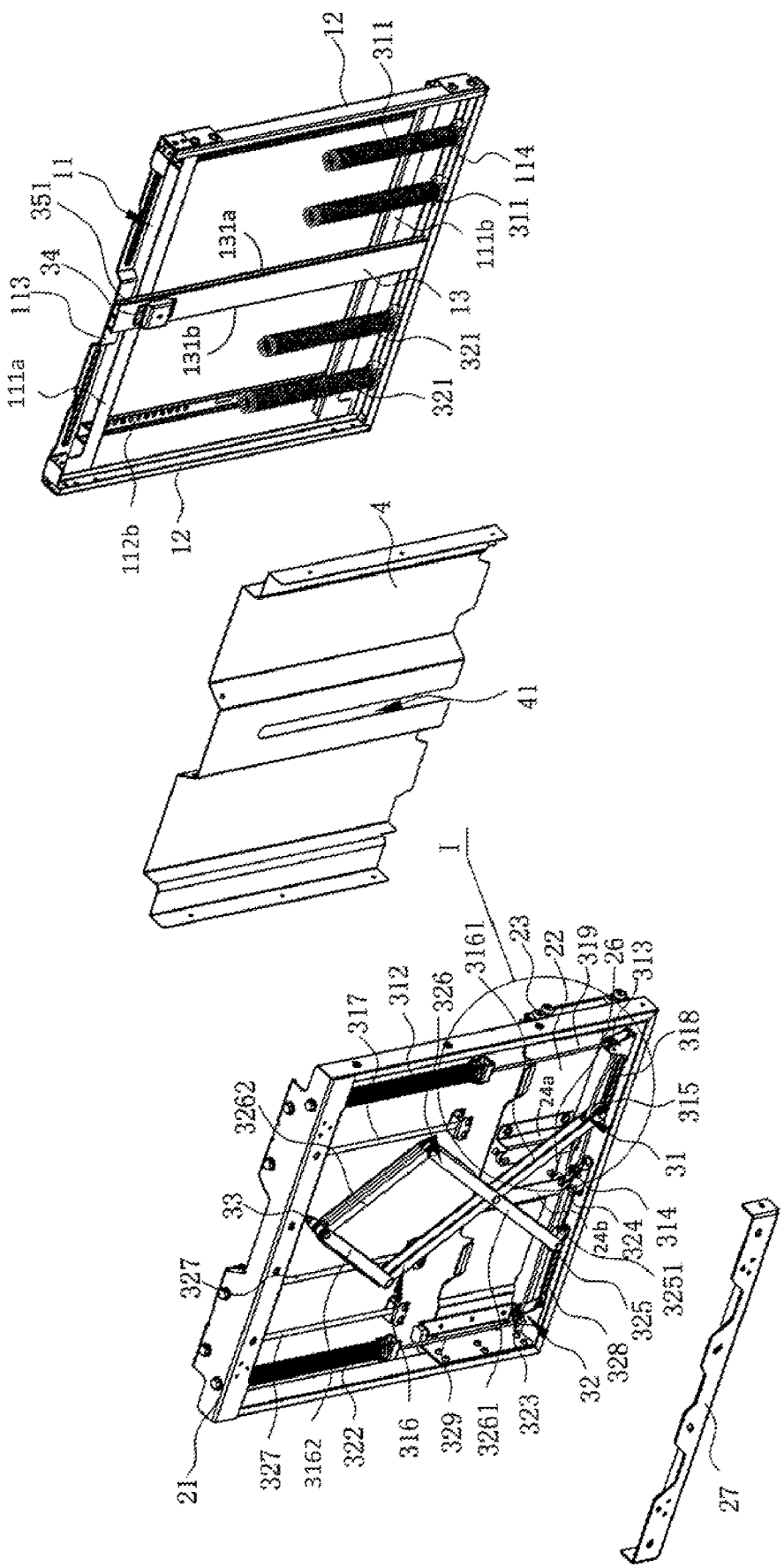
FIG. 3 is the exploded diagram of the embodiment of the present invention.
Figure 4:
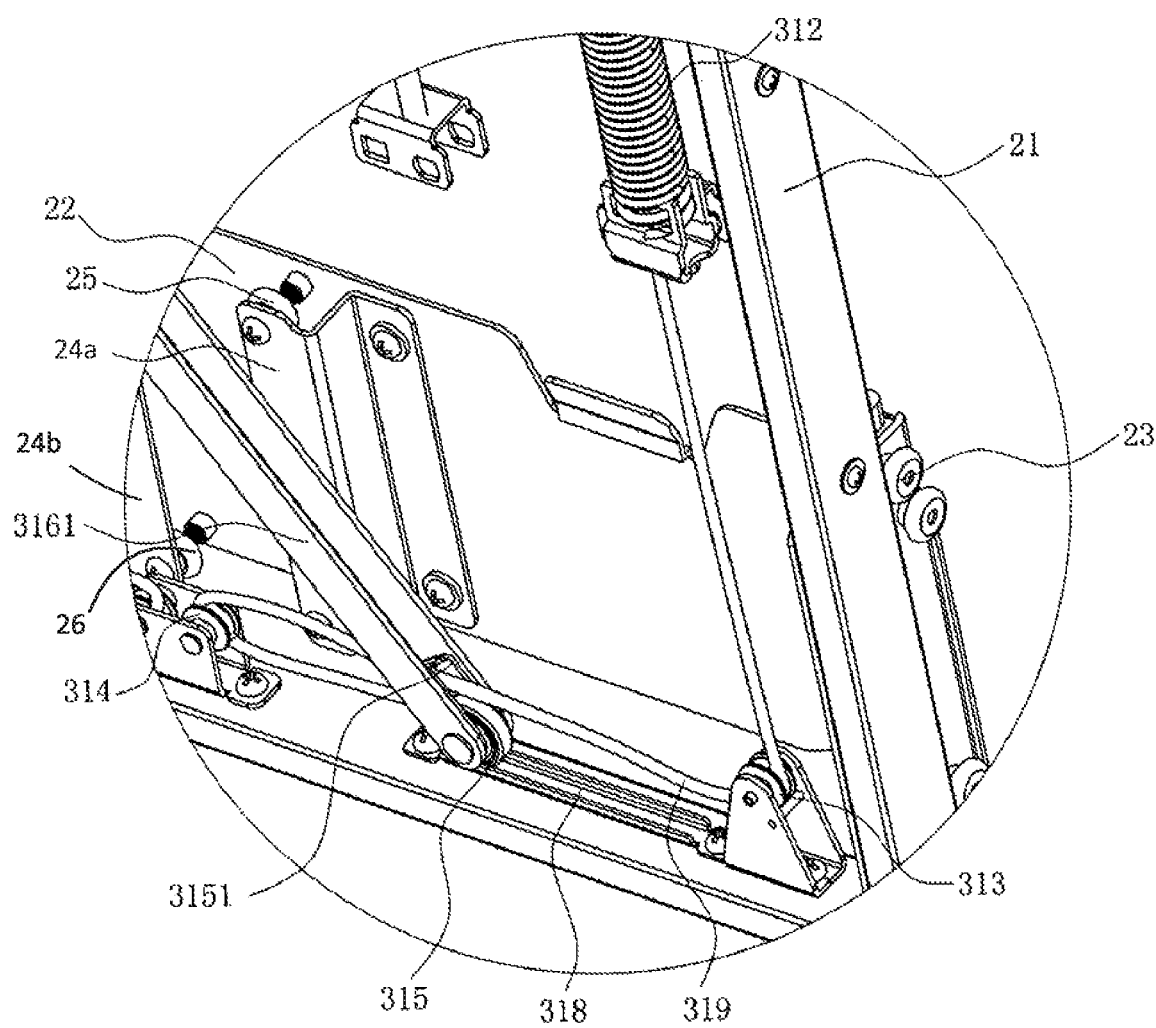
FIG. 4 is the diagram of Part I enlarged in FIG. 3.

FIG. 1 and FIG. 2 are the diagrams of the first state or the initial state of the hanger. When in this state, the movable rack assembly 1 is in the highest position after mounting with the display screen and every tension spring and every balance spring is the shortest. The intersection angle between the first linkage component 316 and the second linkage component 326 is the smallest and the upward force of connection of the pin axis 33 is the biggest. The force toward the middle that is in the closest position to the lower end of the first linkage component 316 and the second linkage component 326 is the smallest.

When adjusting the position of the display screen, one pulls the display screen downward. In this position, every tension spring is stretched and the pin axis 33 moves downward with the rail 13, such that the intersection angle between the first linkage component 316 and the second linkage component 326 becomes bigger and the lower ends of the first linkage component 316 and the second linkage component 326 respectively slide in an opposite direction (toward the left side or toward the right side) and stretch the springs by the draw cords connected to the springs. When the movable rack assembly 1 is pulled downward, the force provided by the tension springs become bigger and the force conducted to the movable rack assembly from the balance springs by the pin axis 33 at the top of the linkage components become smaller. And the increased force provided by the tension springs is equal to the decreased force given to the movable rack assembly 1 from the balance springs. The resultant force of the tension spring and the balance spring keeps balanced, such that the movable rack assembly 1 is kept stable in any position without using any other objects.

Figure 5:
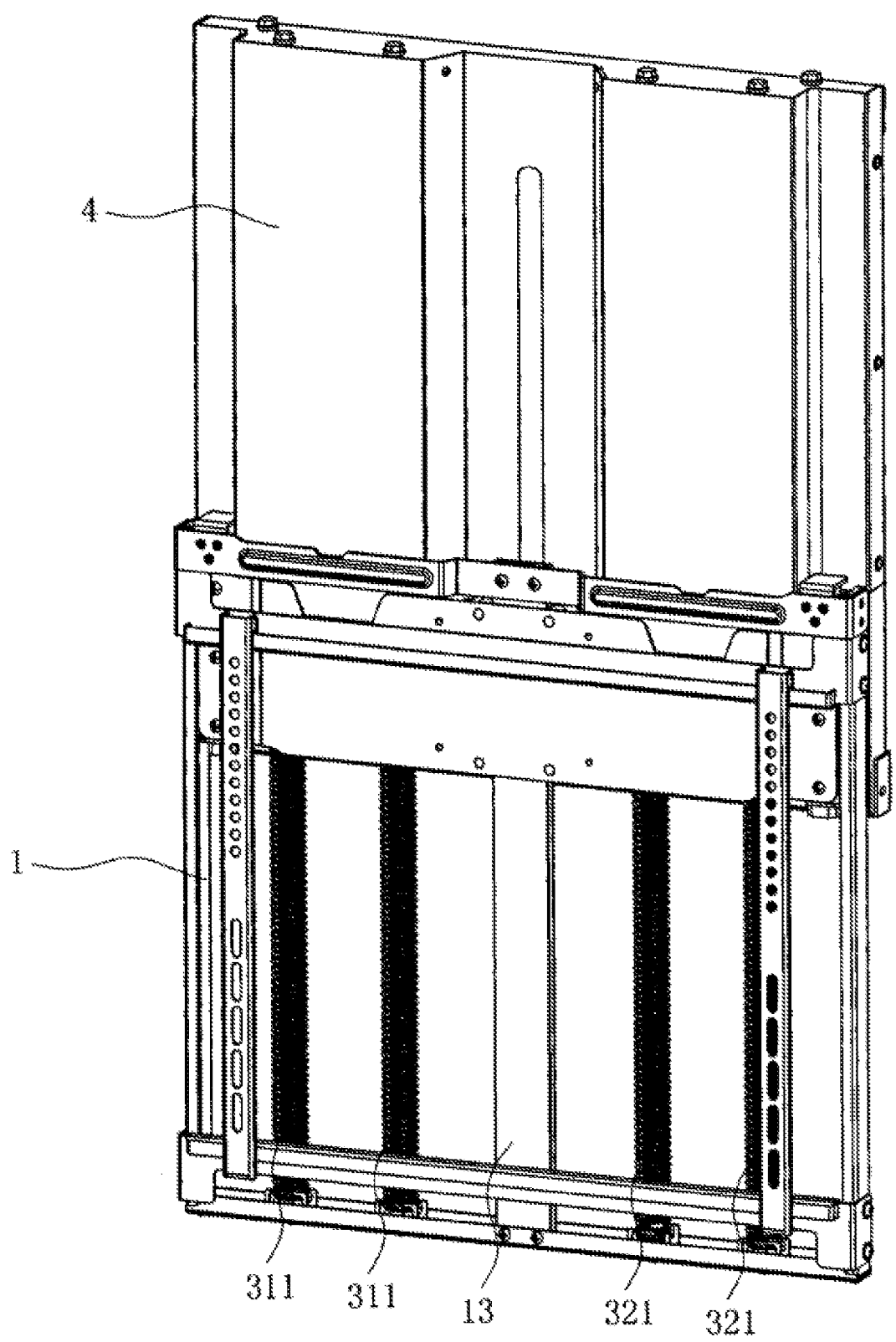
FIG. 5 is the front view of the second state of the embodiment of the present invention.
Figure 6:
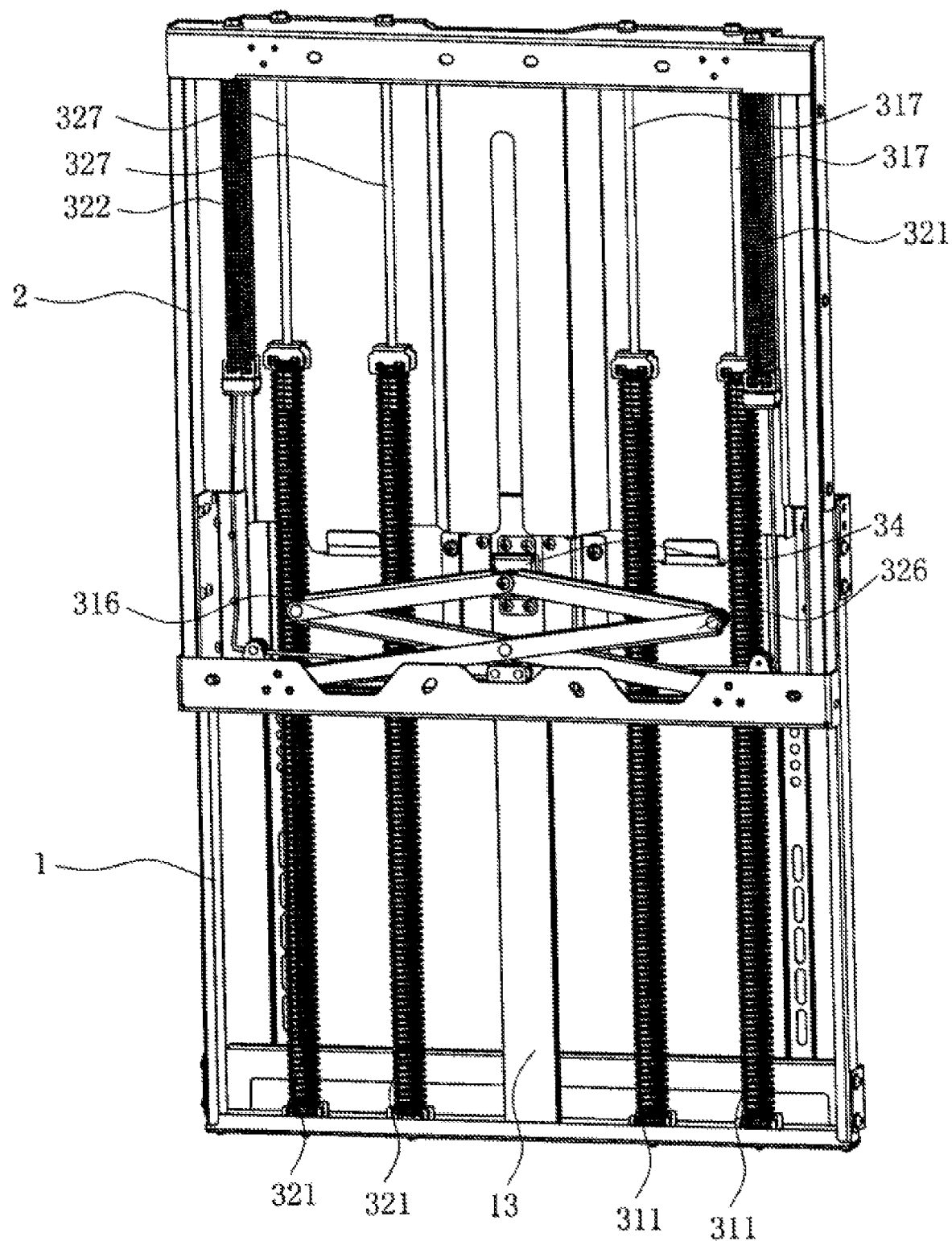
FIG. 6 is the rear view of the second state of the embodiment of the present invention.

FIG. 5 and FIG. 6 are the diagrams of the second state of the hanger. In this position, the movable rack assembly 1 is in the lowest position and every tension spring and every balance spring is the longest. The intersection angle between the first linkage component 316 and the second linkage component 326 is the biggest and the upward force of connection of the pin axis 33 is the smallest. When the first linkage component 316 and the second linkage component 326 are farthest away from each other the force toward the middle is the highest.

When adjusting the position of the display screen in an upward motion, all tension springs contract and the pin axis 33 moves upward with the rail, reducing the intersection angle between the first linkage component 316 and the second linkage component 326. Consequently, the lower ends of the first linkage component 316 and the second linkage component 326 respectively slide face to face, all springs that are connected to the draw cords contract.

When the movable rack assembly 1 is pulled upward, the force provided by the tension springs becomes smaller and the force conducted to the movable rack assembly 1 from the balance springs by the pin axis 33 at the top of the linkage assembly increases. The decreased force provided by the tension springs is equal to the increased force conducted to the movable rack assembly 1 from the balance springs. As a result, the resultant force of the tension spring and the balance spring allows the movable rack assembly 1 to stabilize in any position.

When the display screen is fixed on the movable rack assembly 1, the display screen maintains a balanced in any position after adjustment by the cooperation between the first balance component 31 and the second balance component 32. This simple operation can achieve stepless height adjustment, and the adjustment is fast and stable.

In the above-mentioned examples, where the balance assembly 1 is symmetrically arranged in two sets as described, alternatively, the balance assembly can only comprise one balance spring. In this embodiment, the lower end of the balance spring is connected to the lower end of the corresponding first linkage component 316 or the second linkage component 326 (only one set of pulley components is needed) by the first draw cord 319 or the second draw cord 329 respectively. The bottom of the other linkage component is fixed with the bottom of the first frame 11 of the fixed rack assembly 2. In this position, the upper end of the linkage component and the movable rack assembly 1 are in a movable connection in the horizontal direction and synchronously move in the vertical direction. The balance assembly can only comprise one tension spring or three tension springs that are evenly arranged.

The invention claimed is:
1. A lifting display screen hanger, comprising:
   a movable rack assembly configured to connect with a display screen,
   a fixed rack assembly, and a balance assembly;

the movable rack assembly comprises a first frame, the fixed rack assembly comprises a second frame, and the first frame and the second frame are slidably connected;

the balance assembly comprises a plurality of balance springs, a tension spring, a plurality of pulley assemblies, and a linkage assembly, an upper end of the tension spring being connected to a top of the second frame, a lower end of the tension spring being connected to a bottom of the first frame;

the linkage assembly comprises a first linkage component and a second linkage component, a lower end of the first linkage component being positioned at a bottom of the second frame, a lower end of the second linkage component being positioned at the bottom of the second frame, the first linkage component and the second linkage component intersecting each other and hinged at an intersection of the first linkage component and the second linkage component;

the plurality of balance springs comprises a first balance spring comprising an upper end and a lower end and a second balance spring comprising an upper end and a lower end, the upper ends of the first and second balance springs being connected to the top of the second frame, the lower ends of the first and second balance springs being connected with a plurality of draw cords;

the plurality of pulley assemblies comprises a first pulley assembly and a second pulley assembly, and the plurality of draw cords comprises a first draw cord and a second draw cord;

the first pulley assembly is located at the bottom of the second frame and comprises a first fixed pulley and a second fixed pulley, a first end of the first draw cord being connected to the lower end of the first balance spring and a second end of the first draw cord being connected to the lower end of the first linkage component, the first draw cord being routed downward from the first end of the first draw cord around the first fixed pulley, extending laterally from the first fixed pulley to and around the second fixed pulley, and extending laterally from the second fixed pulley to the second end of the first draw cord connected to the lower end of the first linkage component; and the second pulley assembly is located at the bottom of the second frame and comprises a third fixed pulley and a fourth fixed pulley, a first end of the second draw cord being connected to the lower end of the second balance spring and a second end of the second draw cord being connected to the lower end of the second linkage component, the second draw cord being routed downward from the first end of the second draw cord around the third fixed pulley, extending laterally from the third fixed pulley to and around the fourth fixed pulley, and extending laterally from the fourth fixed pulley to the second end of the second draw cord connected to the lower end of the second linkage component.

2. A lifting display screen hanger according to claim 1, wherein the first linkage component comprises a first linkage segment and a second linkage segment, a lower end of the first linkage segment is connected to the first draw cord, an upper end of the first linkage segment and a lower end of the second linkage segment are hinged; the second linkage component comprises a third linkage segment and a fourth linkage segment, a lower end of the third linkage segment is connected to the second draw cord, an upper end of the third linkage segment and a lower end of the fourth linkage segment are hinged, the second linkage segment and the fourth linkage segment are hinged at an uppermost hinged point of the first linkage component and the second linkage component by a pin axis.

3. A lifting display screen hanger according to claim 2, wherein the lower end of the first linkage segment is connected to a first track wheel and the lower end of the second linkage segment is connected to a second track wheel.

4. A lifting display screen hanger according to claim 1, wherein the upper end of the tension spring is connected to the top of the second frame by a screw arbor.

5. A lifting display screen hanger according to claim 1, wherein the movable rack assembly further comprises a first track that extends vertically upward along a left side of the first frame, and a second track that extends vertically upward along a right side of the first frame, the first track being positioned opposite the second track, each of the first and second tracks comprising a channel; the fixed rack assembly further comprises a first wheel that is located on a front side of the second frame and corresponds to a position of one of the channels of the first and second tracks, the first wheel being slidably engaged with the one of the channels of the first and second tracks.

6. A lifting display screen hanger according to claim 5, wherein the movable rack assembly further comprises a rail, the rail being vertically attached to the first frame, an uppermost hinged point of the first linkage component and the second linkage component being connected to the rail.

7. A lifting display screen hanger according to claim 6, wherein a lower part of the front side of the second frame comprises a connecting plate, a back side of the connecting plate is provided with a first limiting bracket and a second limiting bracket, respectively, on a left side of the rail and a right side of the rail, the left side of the rail and the right side of the rail are provided with a plurality of grooves which respectively dent toward a center of the rail, each of the plurality of grooves extends in a vertical direction, each of the first limiting bracket and the second limiting bracket is provided with a second wheel and a third wheel with a rolling connection to a respective one of the plurality of grooves, the second wheel on the first limiting bracket is positioned above the third wheel on the first limiting bracket, and the second wheel on the second limiting bracket is positioned above the third wheel on the second limiting bracket.

8. A lifting display screen hanger according to claim 7, wherein a covering plate is located and attached above the connecting plate and on the front side of the second frame, a slot is arranged in a center of the covering plate that corresponds to the rail, and a pin axis passes through the slot and is connected to the rail.

* * * * *